Patented July 22, 1952

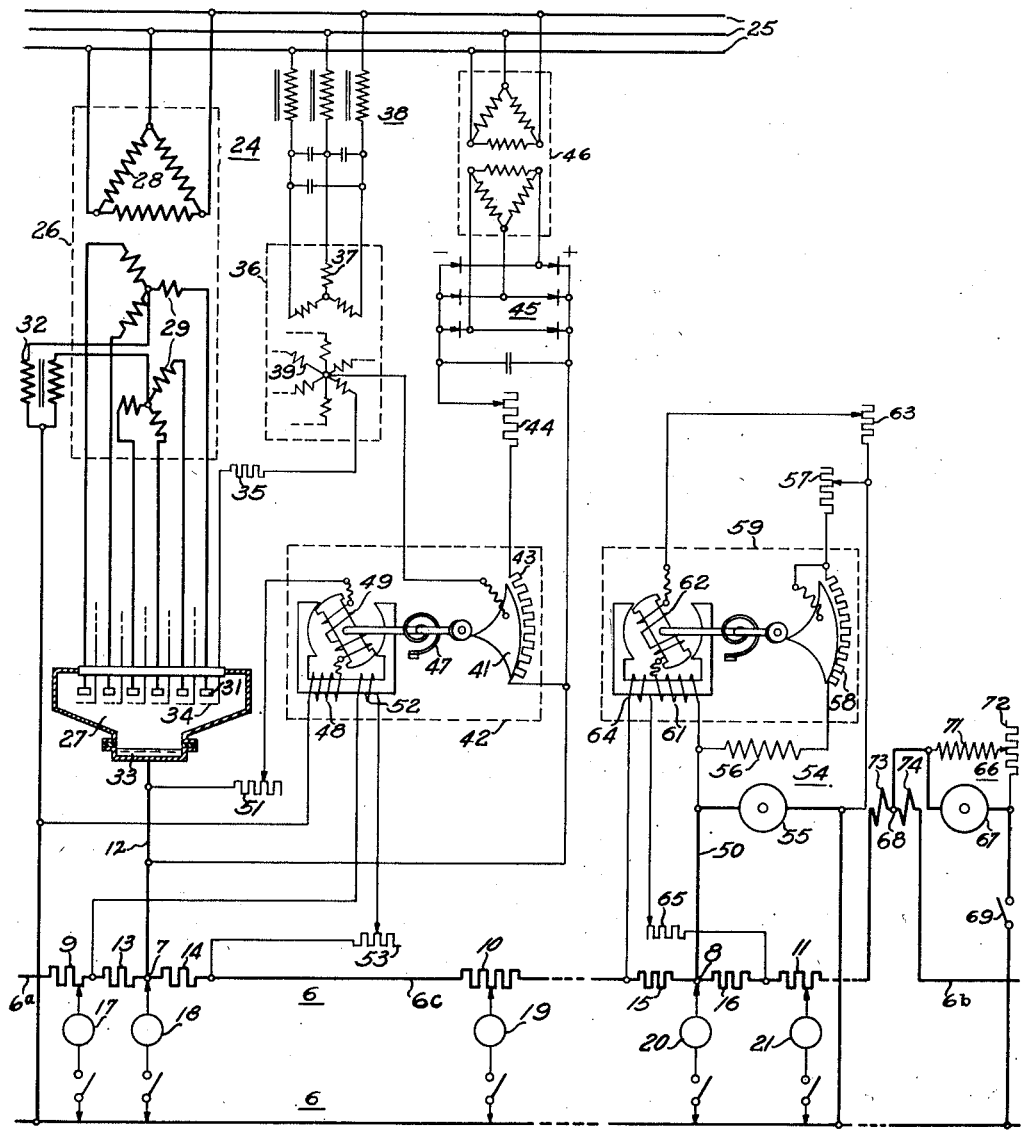

2,604,498

UNITED STATES PATENT OFFICE 2,604,498

ELECTRIC REGULATING SYSTEM RESPONSIVE TO CURRENTS IN TWO LOAD CONDUCTORS

Boris Volgovskoy, Wauwatosa, Wis., assignor to Allis-Chalmers Manufacturing Company, Milwaukee, Wis., a corporation of Delaware Application March 7, 1945, Serial No. 581,530

18 Claims. (Cl. 171—119)

This invention relates in general to improvements in electrical distribution systems and more particularly to means for controlling the division of current between a plurality of current supplying means or of current consuming means connected at different points of a distribution system.

In the art of electrical distribution, a distribution system is frequently utilized for joining a plurality of current sources remote from each other to make the joint output of the sources available to a plurality of current consuming devices likewise remote from each other. A drawback of arrangements of this character is that when the load devices and the sources are not distributed along the circuit in substantially the same manner, the different sections of the circuit carry currents of different magnitudes which produce therein different voltage drops, whereby the division of current between the different sources and between the different loads is adversely affected.

In particular, when a plurality of variable traveling loads are supplied from a common track conductor, the division of current between the sources connected at different points of the track varies widely with the location of the loads and with their momentary current requirements. The current division may be partially improved by imparting to the generators suitable characteristics but the voltage of the distribution circuit is then subject to excessive variations. This condition may be improved by controlling each source in response to the magnitude of its own current and of the currents of the other sources connected in parallel therewith. Such control, however, requires the provision of pilot wires between the different sources, and the expense of installing and maintaining such pilot wires between distant points is often prohibitive.

When a precisely uniform current division is not required it is therefore more advantageous to control an electrical characteristic of at least one of the current sources or current consumers to improve the current division therebetween in response to an electrical condition of the distribution circuit. For example, if two sources are connected at intermediate points of the circuit, the voltages of the two sources may be controlled in response to the direction of flow of energy through the distribution circuit at such points. In this manner the voltage of each source is raised when the major portion of the load is located toward or beyond the other source and the voltage is lowered when the major portion of the load is located away from the other source. A substantial improvement may thus be obtained in the division of current between the sources in return for the provision of control equipment involving a relatively negligible expenditure. To obtain the desired result it is convenient to provide each source with regulating means differentially effective in response to the magnitudes of the currents flowing from the point of connection thereof to adjacent portions of the circuit.

While the system above outlined is particularly advantageous for the control of two generators or converters connected at intermediate points of a distribution circuit supplying direct current to a plurality of traveling loads, numerous modifications thereof will readily occur to meet particular operating requirements. In particular the sources to be controlled may be direct current generators, alternating current generators, or converters of the rotary or of the electric valve type. The number of sources may be greater than two, the sources may be alike or of different types, and all or less than all the sources may be controlled as outlined above in dependence upon the particular operating requirements to be met. The controlled apparatus may also be current consuming devices such as motors, or such as synchronous condensers or converters receiving current from the distribution circuit for transmission in another form to another circuit. The control may be effected in response to current or in response to other quantities involving current such as power, or as total volt-amperes or reactive volt-amperes in alternating current systems. In direct current systems the regulation is effected through the means controlling the voltage of a source or the back E. M. F. of a current consumer. In the control of alternating current generators the regulating effect may be transmitted to the governors of the prime movers driving the generators.

It is therefore an object of the present invention to provide a system of electrical distribution in which the current division between remote parallel generators, converters or current consumers may be controlled without subjecting the system to excessive voltage variations and without providing interconnections between the different control devices.

Another object of the present invention is to provide a system of distribution in which an electrical characteristic of a generator, converter, or current consumer connected to a distribution circuit is controlled in dependence upon the direction of the flow of energy through the circuit at the point of connection thereof.

Another object of the present invention is to provide a system of distribution in which an electrical characteristic of a generator, converter, or current consumer connected to a distribution circuit is controlled differentially in response to the magnitudes of the currents flowing between a point of connection and the adjacent portions of the distribution circuit.

Another object is to provide a system of distribution comprising a plurality of sources connected to a distribution circuit in which the voltage of a source is raised when the major portion of the load is located toward or beyond another source and the voltage is lowered when the major portion of the load is located away from the other source.

Objects and advantages other than those above set forth will be apparent from the following description when read in connection with the accompanying drawing, which diagrammatically illustrates a direct current distribution system energized from two direct current generators and a current converter of the electric valve type all controlled in dependence upon the direction of the flow of energy through the distribution circuit.

Referring more particularly to the drawing by characters of reference, numeral 6 generally designates a direct current distribution circuit such as the track circuit of a traction system or of a group of traveling material handling devices such as ore unloaders or wharf cranes. Circuit 6 is assumed to be provided with suitable current supply means at two intermediate points thereof designated by 7 and 8, whereby the circuit is operatively divided into two end sections and an intermediate section. One end-section of circuit 6 comprises the positive conductor 6a. The other end-section of circuit 6 comprises the positive conductor 6b. The intermediate section lying between points 7 and 8 comprises the positive conductor 6c. It is thus apparent that conductors 6a and 6c are joined together at intermediate point 7 of circuit 6, and conductors 6b and 6c are joined together at intermediate point 8. For the purpose of explaining the operation of the system, the resistance of circuit 6 is assumed to be concentrated in the positive conductor thereof. In the drawing the resistance of the major parts of the three sections of circuit 6 is represented by resistors 9, 10, 11. The circuit portions adjacent points 7 and 8, the resistance of which intervenes in the control of the current sources, are represented by further resistors 13, 14, 15 and 16. Circuit 6 is assumed to be required to supply current to an electric motor connected at a point thereof or to a plurality of electric motors simultaneously connected to points distributed over the length of the different circuit sections or occasionally concentrated in one section thereof. Motors connected at representative points of circuit 6 are shown on the drawing at 17 to 21, inclusive.

The current supply means connected at point 7, through a feeder 12, is assumed to consist of a current converter 24 of the electric valve type energized from an alternating current supply circuit 25. Converter 24 may be of any suitable known type and may comprise a transformer 26 and a plurality of electric valves 27. Transformer 26 comprises a primary winding 28 connected with the different conductors of circuit 25 and a secondary winding 29 divided into a plurality of phase displaced portions severally connected with the anodes 31 of the different valves. Winding 29 is preferably arranged to define a plurality of neutral points connected with the negative conductor of circuit 6 through an interphase transformer 32. Each anode 31 may be assembled with the associated cathode within a separate casing or, as shown, the different anodes may all be arranged in a common casing provided with a common cathode 33 connected with the positive conductor of circuit 6 at point 7. The cathode is provided with the usual means (not shown) for initiating and maintaining the emission of electrons thereat.

The conductivity of valves 27 is controlled by means of suitable control electrodes 34 which may be of the grid type, at least when the continuously emissive type of cathode is provided. The potentials of the different control electrodes are controlled by connecting each control electrode with cathode 33 through a control circuit comprising a current limiting resistor 35 and one of the secondary phase portions of a control transformer 36. The primary winding 37 of transformer 36 is energized from circuit 25 and is preferably connected therewith through a wave filter 38 of any suitable known type. The secondary winding 39 of transformer 36 is connected in star to provide a neutral point connected with the movable tap or sector 41 of a regulator 42. Sector 41 is associated with a resistor 43 to form a rheostat connected with cathode 33 and also connected, through an adjusting resistor 44, with any suitable source of direct current such as a rectifier 45 energized from circuit 25 through a transformer 46.

Sector 41 is actuated by an electromagnetic mechanism against the action of a spring 47 which may be so dimensioned and arranged as to oppose a substantially constant torque to the movement of the sector regardless of the position thereof. The actuating mechanism of regulator 42 is so energized as to be responsive to the flow of energy through circuit 6 at point 7 to affect the volt-ampere characteristic of converter 24. More specifically, the mechanism comprises a field winding 48 serially connected with an armature winding 49 and with an adjusting resistor 51 across the output terminals of converter 24. The action of winding 48 is modified by a second field winding 52 connected across resistors 13, 14 through an adjusting resistor 53.

The current supply means connected at point 8 may be a converter similar to converter 24 and similarly connected. In order to render more fully apparent the scope of the invention it will be assumed however that circuit 6 receives current at point 8, through a feeder 50, from a direct current generator 54 driven by a suitable prime mover (not shown) or by an electric motor (not shown) which may be energized from circuit 25. The armature winding 55 of generator 54 is directly connected across circuit 6 at point 8. The field winding 56 of the generator is connected across the terminals of armature winding 55 through an adjusting resistor 57 and through the rheostat 58 of a regulator 59 similar to regulator 42. Regulator 59 is provided with a field winding 61 serially connected with the associated armature winding 62 and an adjusting resistor 63 across armature winding 55 and circuit 6. The effect of winding 61 is modified by another field winding 64 connected across resistors 15, 16 through an adjusting resistor 65.

Although the present invention is most advantageous when only two current sources are connected to a single distribution circuit, operating requirements sometimes permit connecting more than two sources controlled in the above described manner. It is therefore assumed that circuit 6 may be provided with a third current source, such as a direct current generator 66 comprising an armature winding 67 which may be connected across circuit 6 at point 68 through a switch 69. To illustrate the fact that the control of any source connected with circuit 6 in response to the direction of the flow of energy through circuit 6 may be effected without the assistance of a regulator, generator 66 is assumed to be provided with a shunt field winding 71 connected across armature winding 67 through an adjusting resistor 72. The voltage of armature winding 67 is varied differentially in response to the magnitudes of the currents flowing from point 68 to the adjacent portions of circuit 6 by means of two differentially connected series windings 73, 74 inserted in the portions of circuit 6 adjacent point 68.

While the system connected as above described may operate with motors 17 to 21 supplying current to circuit 6 as in the regenerative braking operation of such motors, converter 24 and generators 54, 66 then acting as current consuming devices with respect to circuit 6, the operation of the system will only be described assuming that current is always supplied from circuit 6 to motors 17 to 21.

In operation, motors 17 to 21 being disconnected from circuit 6 and generator 66 likewise being disconnected from circuit 6 by means of switch 69, generator 54 and converter 24 may be placed in operation under no-load condition. When generator 54 is driven by the associated prime mover or motor, the generator voltage builds up in the well known manner. The generator voltage is impressed on windings 61, 62 of regulator 59 and the interaction of the regulator windings causes the regulator to adjust the voltage of generator 54 to a predetermined value depending on the setting of the regulator spring. No current consuming device being connected with circuit 6, winding 64 is without current and does not affect the operation of the regulator.

When circuit 25 is energized, transformer 46 and rectifier 45 supply current to rheostat 43, the different points of which are accordingly at different negative potentials with respect to the potential of cathode 33. Transformer 36 impresses on the different control electrodes 34 alternating potential components which render the different valves conductive in sequence, provided that cathode 33 has been rendered emissive. Transformer 26 is also energized, whereby winding 29 impresses on valves 27 voltages which sequentially bring anodes 31 to positive potentials with respect to the potential of cathode 33, and the anodes transmit current sequentially from winding 29 as a flow of unidirectional current through resistor 51, windings 49, 48 and interphase transformer 32 back to winding 29.

The interaction of windings 48, 49 causes regulator 42 to move sector 41, thereby impressing an increasing negative potential component on control electrodes 34. This component retards the moments of positive energization of the control electrodes from winding 39 and thereby causes the periods of current flow through anodes 31 to be retarded to the same extent. As is well known, the result thereof is that the output voltage of converter 24 is decreased to an extent corresponding to the magnitude of the control electrode negative potential component. The movement of regulator 42 stops when the torque produced by windings 48, 49 balances the torque of spring 47, thereby insuring that the output voltage of converter 24 is maintained substantially constant at a predetermined value depending on the setting of spring 47. If regulators 42, 59 are adjusted for the same value of voltage there is no current flow between converter 24 and generator 54. Winding 52 therefore is without current and does not affect the operation of regulator 42.

The operation of the system will be further considered assuming motors 17 to 21 to be connected with circuit 6, one at a time, in numerical order. If motor 17 is connected alone, converter 24 and generator 54 both supply current to the motor and the load and the generator are connected to points of circuit 6 on opposite sides of converter 24. The voltage drop produced by the flow of generator current in resistor 10 tends to cause the generator to carry considerably less than its share of the load current, and converter 24 accordingly tends to supply more than the desired proportion of the load current. The flow of generator current through resistor 15, however, causes winding 64 of regulator 59 to be energized in proportion thereto. The action of winding 61 is thereby modified in response to the flow of current through circuit 6 from point 8 in one direction only, that is, toward point 7, and the regulator causes the voltage of generator 54 to rise in proportion to the magnitude of the flow of current through resistor 15. In other words, the generator is then imparted a rising volt-ampere characteristic.

The converter current flowing through resistor 13 and the generator current flowing through resistors 14 and 13 produce in the resistors a voltage drop which is impressed on winding 52 of regulator 42. Winding 52 then carries current and modifies the action of winding 48. The output voltage of converter 24 is thereby caused to drop to a corresponding extent and the converter therefore assumes a drooping volt-ampere characteristic. As a result of the operation of the regulators, the current of generator 54 is increased and the current of converter 24 is decreased, thereby reducing to a considerable extent the disproportion between the two currents. It will be observed that winding 52 is energized in proportion to the magnitude of the generator current flowing in resistor 14 toward point 7 in addition to the magnitudes of generator current and converter current both flowing through resistor 13 away from point 7, or in proportion to the algebraic difference of the currents flowing from point 7 to the adjacent resistors 13, 14.

If motor 18 is connected instead of motor 17, converter 24 supplies current to the motor but the flow of converter current does not take place through resistors 13, 14 and therefore does not affect the operation of regulator 42. The current of generator 54 flows through resistor 15 and therefore causes regulator 59 to impart to the generator a rising volt-ampere characteristic. The generator current also flows through resistor 14, thereby causing regulator 42 to impart to converter 24 a drooping volt-ampere characteristic. The division of current between the generator and the converter is thus again improved.

If motor 19 is connected alone, the load and the generator are connected to points of circuit 6 on the same side of converter 24. The generator current again flows through resistor 15 and causes regulator 59 to impart to generator 54 a rising volt-ampere characteristic. The current supplied from converter 24 to motor 19 then flows away from point 7 through resistor 14. The flow of current through circuit 6 at point 7 has been reversed and therefore, the flow of energy through circuit 6 at point 7, has likewise been reversed. The reversal of the flow of current through resistor 14 causes the current of winding 52 to reverse, whereby regulator 42 is caused to impart to converter 24 a rising volt-ampere characteristic. The generator and the converter then have similar characteristics and supply current through portions of circuit 7 of comparable resistance, so that the current division between the converter and the generator remains satisfactory.

When motor 20 is connected to circuit 6 it will be apparent that the generator current is without action on the operation of regulator 59. The converter current flows in resistor 14 and thereby causes regulator 42 to impart to the converter a rising volt-ampere characteristic. The converter current also flows through resistor 15 toward point 8 and thus reverses the flow of energy through circuit 6 at point 8 to cause regulator 59 to impart to generator 54 a drooping volt-ampere characteristic. The generator current is thus caused to be substantially less excessive and the converter current is caused to be substantially less deficient than in the absence of windings 52, 64 of the regulators.

If motor 21 is connected, the converter current flows through resistor 14 and causes regulator 42 to impart to the converter a rising volt-ampere characteristic. The converter current flows through resistors 15, 16 and the generator current flows through resistor 16 alone, thereby causing regulator 59 to impart to generator 54 a drooping volt-ampere characteristic giving a satisfactory current division between the generator and the converter.

If a motor is connected with circuit 6 at any point intermediate one of the resistors 13, 14, 15, 16 the effects of the converter current and of the generator current on the action of regulators 42, 59 will be intermediate those obtaining when motors are connected with terminals of the resistors. If a plurality of motors are connected with one particular section of circuit 6 the action of windings 52, 64 of the regulators will be amplified in proportion to the resulting increase in the motor current to cause the converter and the generator to operate at different points of the above recited volt-ampere characteristics. If motors are connected simultaneously with different sections of circuit 6, as by simultaneously connecting motors 17 to 21, for example, the effects of the different motor currents on the action of regulators 42, 59 are cumulative. The division of current between the converter and the generator will then be further improved by comparison with the current division obtaining when motors are connected with only one section of the distribution circuit 6.

Switch 69 may be closed to connect generator 66 in parallel with generator 54 and converter 24. The effect of the current of generator 66 on the operation of regulators 42, 59 is then added to the effects of the currents of generator 54 and of converter 24. It will be observed that as generator 66 is assumed to be shunt connected, the flow of current through field winding 71 thereof is such as to tend to impart to the generator a slightly drooping volt-ampere characteristic. The flow of current from armature 67 through series winding 73 accentuates the droop of the characteristic of generator 66. The flow of current from armature 67 through series winding 74 and of current from generator 54 and converter 24 through series windings 73, 74 imparts to generator 66 a rising volt-ampere characteristic to control the division of current between generator 66 and the other sources connected with circuit 6. The action of windings 73, 74 is thus entirely similar to the action of winding 64 of regulator 59.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. An electric distribution circuit comprising current supply means, a distribution circuit for said current supply means, said circuit comprising two conductors joined together at an intermediate point of said circuit, a feeder connecting said current supply means with said conductors at said intermediate point for carrying current between said current supply means and said conductors, said conductors being in parallel connection with respect to said feeder, and regulator means for controlling an electrical characteristic of said supply means comprising means responsive to the algebraic difference of the magnitudes of the currents flowing at said point through said conductors and means responsive to the magnitude of the voltage of said circuit at said point.

2. An electric distribution system comprising a dynamoelectric machine, a distribution circuit for said machine, said distribution circuit comprising two conductors joined together at an intermediate point of said circuit, a feeder connecting said machine to said conductors at said point, said conductors being in parallel connection with respect to said feeder, and field excitation means for said machine comprising regulating means connected with both said conductors responsive to the direction of the flow of energy through both conductors at said point.

3. An electric distribution system comprising a dynamoelectric machine, a distribution circuit for said machine, said distribution current comprising two conductors joined together at an intermediate point of said circuit, a feeder connecting said machine with said conductors at said point, said conductors being in parallel connection with respect to said feeder, and field excitation means for said machine comprising regulating means connected with both said conductors responsive to the direction of the flow of energy through both of said conductors at said point and means responsive to the magnitude of the voltage of said circuit at said point.

4. An electric distribution system comprising a dynamoelectric machine, a distribution circuit for said machine, said distribution circuit comprising two load conductors connected together at an intermediate point of said circuit, a feeder connecting said machine to said conductors at said point, said conductors being in parallel relation with respect to said feeder, and field excitation means for said machine comprising winding means differentially effective in response to the magnitudes of the load currents flowing from said point through said conductors.

5. An electric distribution system comprising a dynamoelectric machine, a distribution circuit for said machine, said distribution circuit comprising two load conductors connected together at an intermediate point of said circuit, a feeder connecting said machine with said conductors at said point, said conductors being connected in parallel connection with respect to said feeder, field excitation means for said machine comprising winding means differentially effective in response to the magnitudes of the load current flows from said point through said conductors and winding means responsive to the magnitude of the voltage of said circuit at said point.

6. An electric distribution system comprising a dynamoelectric machine, a distribution circuit for said machine, said distribution circuit comprising two load conductors joined together at an intermediate point of said circuit, a feeder connecting said machine with said conductors at said point, said conductors being in parallel connection with respect to said feeder, and field excitation means for said machine comprising winding means responsive to the voltage of said machine for maintaining the voltage of said machine substantially constant and current responsive winding means for modifying the action of said voltage responsive winding means, said current responsive winding means being so connected to both said conductors as to be differentially effective in response to the magnitudes of the load current flows from said point to the said conductors.

7. An electric distribution system comprising an electric current converting system comprising an electric valve, a distribution circuit for said valve, said distribution circuit comprising two conductors joined together at an intermediate point of said circuit, a feeder connecting said valve with said conductors at said intermediate point, said conductors being in parallel connection with respect to said feeder, and regulating means for controlling the conductivity of said valve comprising means connected with both said conductors responsive to the direction of the flow of energy through both said conductors at said intermediate point.

8. An electric distribution system comprising an electric current converting system comprising an electric valve having a control electrode, a distribution circuit for said valve, said distribution circuit comprising two conductors joined together at an intermediate point of said circuit, a feeder connecting said valve with said conductors at said point, said conductors being in parallel connection with respect to said feeder, and regulating means for controlling the potential of said electrode comprising winding means connected with both said conductors responsive to the direction of the flow of energy through both said conductors at said point.

9. An electric distribution system comprising an electric current converting system comprising an electric valve having a control electrode, a distribution circuit for said valve, said distribution circuit comprising two conductors joined together at an intermediate point of said circuit, a feeder connecting said valve with said conductors at said point, said conductors being in parallel connection with respect to said feeder, and regulating means for controlling the potential of said electrode comprising winding means differentially effective in response to the magnitudes of the current flows from said point through said conductors.

10. An electric distribution system comprising an electric current converting system comprising an electric valve having a control electrode, a distribution circuit for said valve, said distribution circuit comprising two conductors joined together at an intermediate point of said circuit, a feeder connecting said valve with said conductors at said intermediate point, said conductors being in parallel connection with respect to said feeder, and regulator means for controlling the potential of said electrode comprising winding means differentially effective in response to the magnitudes of the current flows from said point to said conductors and winding means responsive to the magnitude of the voltage of said circuit at said point.

11. An electric distribution system comprising an electric current converting system comprising an electric valve having a control electrode, a distribution circuit for said valve, said distribution circuit comprising two conductors joined together at an intermediate point of said circuit, a feeder connecting said valve with said conductors at said point, said conductors being in parallel connection with respect to said feeder, and regulator means for controlling the potential of said control electrode comprising winding means responsive to the output voltage of said converter for maintaining said output voltage substantially constant and current responsive winding means for modifying the action of the said voltage responsive winding means, said current responsive winding means being so connected to said conductors as to be differentially effective in response to the magnitudes of the current flows from said point through the said conductors.

12. An electric distribution system comprising an electric current converting system comprising an electric valve having a control electrode, a distribution circuit for said valve, said distribution circuit comprising two conductors joined together at an intermediate point of said circuit, a feeder connecting said valve with said conductors at said point, said conductors being in parallel relation with respect to said feeder, and means for controlling the potential of said control electrode comprising means for impressing a substantially constant alternating component on said control electrode and regulating means for superimposing a variable unidirectional potential component on said alternating component, said regulating means comprising means responsive to the output voltage of said converter for maintaining said output voltage substantially constant and current responsive winding means for modifying the action of said voltage responsive winding means, said current responsive winding means being so connected with said conductors as to be differentially effective in response to the magnitude of the current flows from said point through said conductors.

13. An electric distribution circuit comprising first and second current supply means, a distribution circuit for said supply means, said distribution circuit having an intermediate point so connected with said first supply means as to position a portion of said circuit on one side of said supply means and another portion of said circuit on the other side of said supply means and having another point connected with said second supply means, a plurality of current-consuming means variably connected with said circuit to impose on said circuit a variable load variably distributed along said circuit, and regulating means connected with said circuit including means responsive to the magnitude of the voltage of said circuit at said intermediate point and means operable for raising the voltage of said first supply means in response to the location in said circuit of said second supply means and of the major portion of said load on the same side of said first supply means and operable for lowering the voltage of said first supply means in response to location in said circuit of said second supply means and of the major portion of said load on opposite sides of said first supply means.

14. A system of electric distribution comprising a first current supply means, a distribution circuit for said supply means, said distribution circuit comprising first and second conductors joined together at an intermediate point of said circuit, said first current supply means being connected with said intermediate point for supplying current to said conductors, said conductors being in parallel connection with respect to said first current supply means, a second current supply means connected with said first conductor for supplying current to said conductors, said conductors being in series connection with respect to said second current supply means, current-consuming means selectively connectable with said first and second conductors, and regulating means for said first current supply means connected with both said conductors including means responsive to the magnitude of the voltage of said circuit at said intermediate point and means operable for raising the voltage of said first current supply means in response to connection of said current-consuming means with said first conductor and for lowering the voltage of said first current supply means in response to connection of said current consuming means with said second conductor.

15. A system of electric distribution comprising current supply means, a distribution circuit for said supply means, said distribution circuit comprising two load conductors, a feeder connected with said current supply means, two impedance means severally connecting said conductors with said feeder, said conductors being in parallel connection with respect to said feeder, and regulator means for controlling an electrical characteristic of said supply means comprising current responsive means connected across said impedance means.

16. A system of electric distribution comprising a dynamoelectric machine comprising an armature and differentially acting field windings, a distribution circuit for said machine, said distribution circuit comprising two conductors, a feeder connected with said armature, each said field winding connecting one of said conductors with said feeder to effect parallel connection of said conductors with respect to said armature.

17. An electric distribution system comprising current supply means, a distribution circuit for said current supply means, said circuit comprising two load conductors, a feeder connected with said supply means, two resistive means severally connecting said conductors with said feeder, whereby said conductors are placed in parallel connection with respect to said feeder, and regulator means for controlling an electrical characteristic of said supply means comprising means connected across said resistive means energized in response to the algebraic difference of the magnitudes of the currents flowing from said point through said conductors.

18. An electric distribution system comprising current supply means including inductive winding means for regulating the voltage thereof, a distribution circuit for said current supply means, said circuit comprising two load conductors, a feeder connected with said current supply means, and connecting means including said winding means for connecting said conductors with said feeder, said connecting means having a terminal connected to one of said conductors, another terminal connected to the other of said conductors and an intermediate point connected to said feeder, whereby said conductors are placed in parallel connection with respect to said feeder and said winding means are energized in response to the algebraic difference of the magnitudes of the currents flowing from said terminals through said conductors.

BORIS VOLGOVSKOY.

REFERENCES CITED

The following references are of record in the file of this patent:

UNITED STATES PATENTS

| Number | Name | Date |
|---|---|---|
| 1,096,930 | Laycock | May 19, 1914 |
| 1,191,627 | Taylor | July 18, 1916 |
| 1,478,011 | Turbayne | Dec. 18, 1923 |
| 1,947,062 | Rudenberg | Feb. 13, 1934 |
| 1,955,325 | Davis | Apr. 17, 1934 |
| 2,072,784 | Wingo | Mar. 2, 1937 |
| 2,086,855 | Degoumois | July 19, 1937 |
| 2,224,067 | Sprong | Dec. 3, 1940 |
| 2,259,306 | Harding | Oct. 14, 1941 |
| 2,262,491 | Edwards | Nov. 11, 1941 |

FOREIGN PATENTS

| Number | Country | Date |
|---|---|---|
| 431,784 | Great Britain | July 10, 1935 |
| 368,996 | Germany | Feb. 10, 1923 |